United States Patent
O'Connell

(10) Patent No.: US 10,041,544 B2
(45) Date of Patent: Aug. 7, 2018

(54) PRELOADING AXLE CLAMP FOR A LANDING GEAR WHEEL BEARING AND A METHOD OF CONTROLLING A PRELOADING FORCE ON A LANDING GEAR WHEEL BEARING

(71) Applicant: Honda Patents & Technologies North America, LLC, Torrance, CA (US)

(72) Inventor: Charles T. O'Connell, Summerfield, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 322 days.

(21) Appl. No.: 14/947,087

(22) Filed: Nov. 20, 2015

(65) Prior Publication Data
US 2017/0146068 A1 May 25, 2017

(51) Int. Cl.
| | |
|---|---|
| F16C 35/00 | (2006.01) |
| F16C 35/063 | (2006.01) |
| B60B 27/02 | (2006.01) |
| B60B 35/02 | (2006.01) |
| B64C 25/36 | (2006.01) |

(52) U.S. Cl.
CPC ............ *F16C 35/063* (2013.01); *B60B 27/02* (2013.01); *B60B 35/02* (2013.01); *B64C 25/36* (2013.01); *B60B 2900/131* (2013.01); *B60B 2900/133* (2013.01); *F16C 2229/00* (2013.01); *F16C 2326/43* (2013.01)

(58) Field of Classification Search
CPC .............. F16C 35/063; F16C 2326/43; F16C 2229/00; F16C 2900/131; B60B 35/02; B60B 27/02; B60B 2900/131; B60B 2900/133; B64C 25/36

See application file for complete search history.

(56) References Cited

U.S. PATENT DOCUMENTS

| | | | |
|---|---|---|---|
| 1,287,350 A | 12/1918 | Lambert | |
| 2,922,199 A | 1/1960 | Dickey | |
| 3,082,047 A | 3/1963 | Bernotas | |
| 3,088,782 A | 5/1963 | Conlan | |
| 3,156,506 A | 11/1964 | Scheifele et al. | |
| 4,072,367 A * | 2/1978 | Johnson, Jr. .......... | F16C 35/063 384/536 |
| 5,251,986 A | 10/1993 | Arena | |
| 8,221,020 B2 | 7/2012 | Svensson et al. | |

OTHER PUBLICATIONS

International Search Report and Written Opinion of PCT/US2016/061750 dated Jan. 23, 2017, 7 pages.

* cited by examiner

*Primary Examiner* — Richard Chang
(74) *Attorney, Agent, or Firm* — Rankin, Hill & Clark LLP

(57) ABSTRACT

A preloading axle clamp for a wheel bearing includes an axle adapted to receive a wheel bearing and a connecting fork. A bushing is positioned about a first end of the axle. A fastener having a first flange is coupled to the first end of the axle, wherein a portion of the fastener is inserted into the first end to retain the connecting fork on the axle. A nut is threadedly coupled to the bushing, wherein rotation of the nut on the bushing causes a preloading force on the wheel bearing.

19 Claims, 5 Drawing Sheets

PRELOADING AXLE CLAMP FOR A LANDING GEAR WHEEL BEARING AND A METHOD OF CONTROLLING A PRELOADING FORCE ON A LANDING GEAR WHEEL BEARING

BACKGROUND

The subject matter disclosed herein relates to wheel bearings and, more particularly, to a preloading axle clamp for a landing gear wheel bearing.

At least some conventional wheel bearings include an inner raceway, an outer raceway, and a plurality of roller elements disposed between the inner raceway and the outer raceway to permit the raceways to rotate relative to each other with minimal frictional force. Such wheel bearings are implemented in a variety of applications, including mounting a wheel on an axle of a landing gear for an aircraft. Often the wheel bearing is preloaded by a process that applies a permanent axial force between the inner raceway and the outer raceway to keep the raceways and the rollers aligned so that they roll properly. In this way, proper preloading eliminates unwanted clearances, creates high stiffness, and reduces noise and vibration, among other benefits for wheel bearing performance. Therefore, precise control of the preload on a landing gear wheel bearing is desirable in order to prolong the operational life of the wheel bearing.

However, preload control may be unreliable for at least some conventional landing gear wheel bearings. Typically, conventional wheel bearing assemblies are effected by a load that is generated from flexure of a landing gear fork. Usually, such loads are unknown and may fluctuate throughout a lifecycle of the landing gear. Therefore, an amount of preload on the conventional landing gear wheel bearings may vary widely depending on the tolerance and the design of the landing gear fork. Further, enduring the additional force from the landing gear fork shortens the operational life of the wheel bearing.

In view of the foregoing, an improved wheel bearing preloading assembly is desired. This disclosure is intended to address the above-noted needs and to provide related advantages.

SUMMARY

In one aspect, a preloading axle clamp for a wheel bearing includes an axle adapted to receive a wheel bearing and a connecting fork. A bushing is positioned about a first end of the axle. A fastener having a first flange is coupled to the first end of the axle, wherein a portion of the fastener is inserted into the first end to retain the connecting fork on the axle. A nut is threadedly coupled to the bushing, wherein rotation of the nut on the bushing causes a preloading force on the wheel bearing.

In another aspect, a method of controlling a preloading force on a wheel bearing is provided. The wheel bearing and a connecting fork are mounted on an axle. The axle is positioned within a first bore defined through a first leg and a coaxial second bore defined through a second leg of the connecting fork. A bushing is positioned at a first end of the axle. A fastener coupled to the first end of the axle positioned within the first bore is rotated to a first predefined torque to retain the connecting fork on the axle. A nut coupled to the bushing is rotated to a bearing seating torque. The nut is then rotated to a second predefined torque to longitudinally slide the bushing along the first end of the axle in a direction toward the wheel bearing to apply the preloading force on the wheel bearing.

In yet another aspect, a preloading axle clamp for a wheel bearing includes an axle adapted to receive a wheel bearing and a connecting fork. A first end of the axle has a broached surface. A bushing is positioned about the axle and slidingly engages the broached surface. A retainer is provided on a second end of the axle, wherein the retainer is stationary and fixed to the second end of the axle. A nut is rotatably coupled to the bushing, wherein rotation of the nut slides the bushing toward the wheel bearing to apply a preloading force on the wheel bearing, and further rotation of the nut applies a clamping force on a first leg of the connecting fork.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

Figure 1:
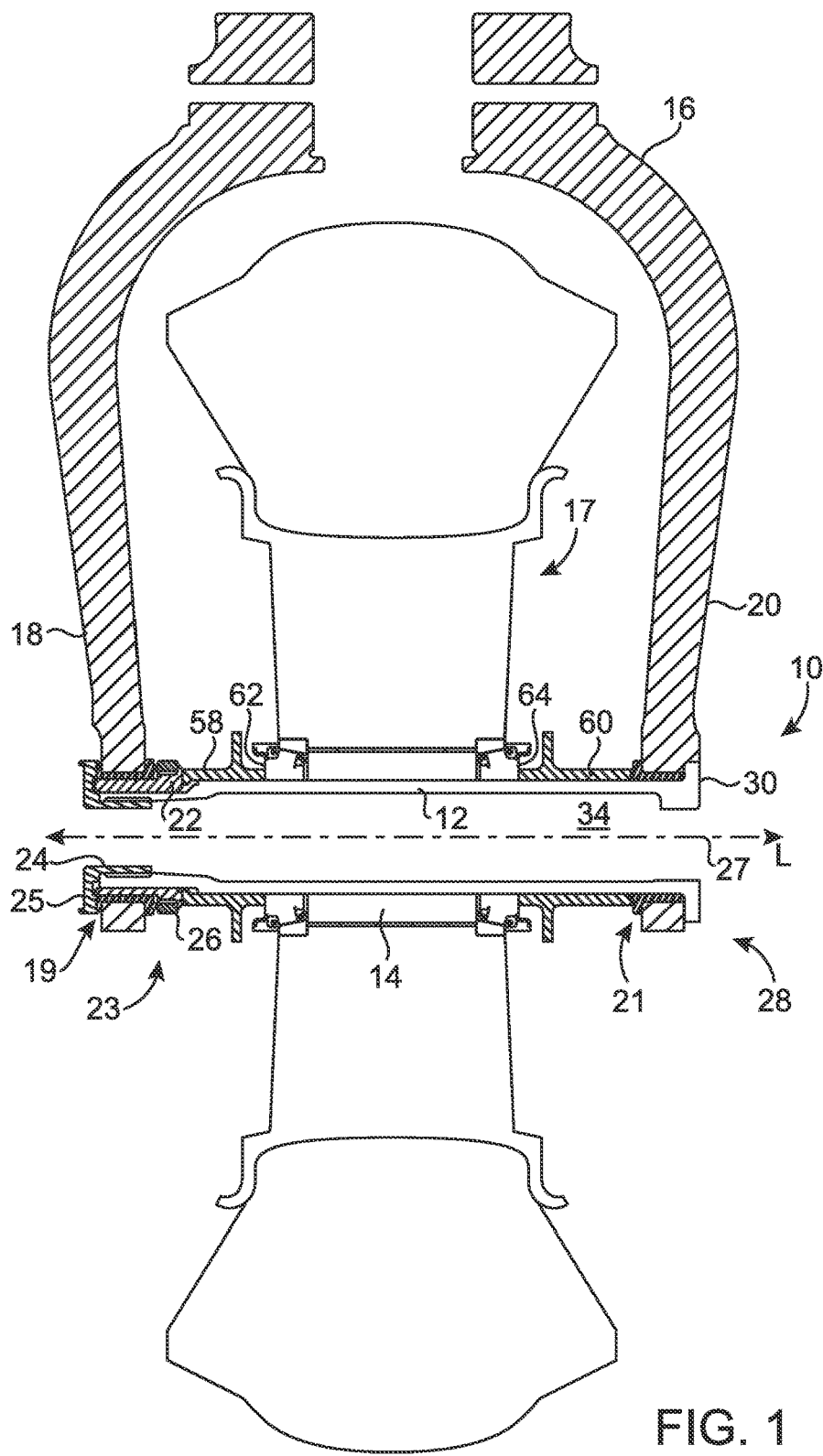
FIG. 1 is a schematic diagram of an exemplary preloading axle clamp deployed on a landing gear, according to various embodiments described herein.
Figure 2:
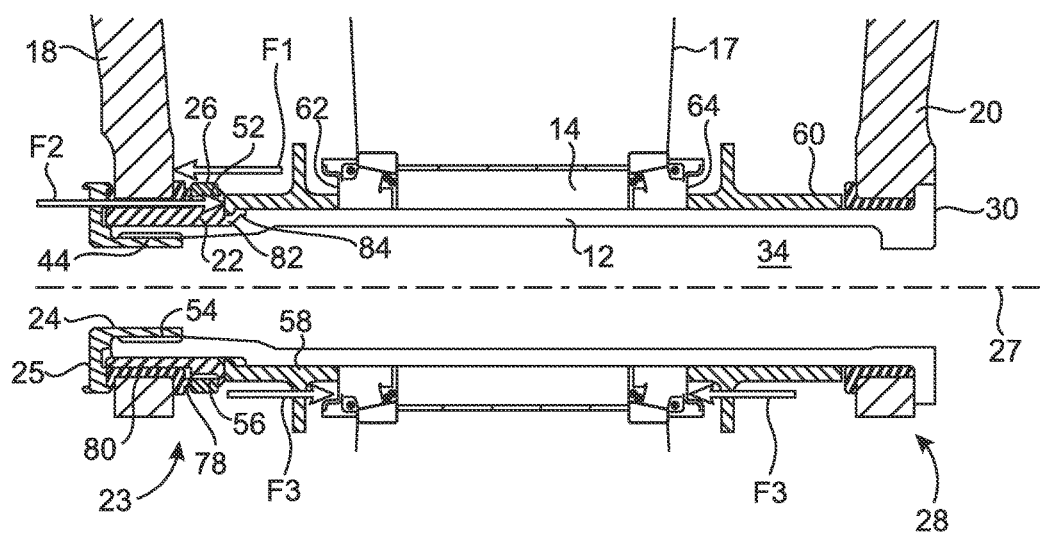
FIG. 2 is a schematic diagram of a portion of the preloading axle clamp of FIG. 1.

FIGS. 1 and 2 show an exemplary embodiment of a wheel bearing preloading axle clamp (hereinafter "axle clamp") 10. The axle clamp 10 includes an axle 12 that is adapted to receive a wheel bearing 14 and a connecting fork, such as a landing gear fork 16. As shown in FIG. 1, a wheel hub 17 is coupled to the wheel bearing 14. In the exemplary embodiment, the landing gear fork 16 has a first leg 18 defining a first bore 19 therethrough and a second leg 20 defining a second bore 21 therethrough coaxially aligned with the first bore 19. The axle 12 extends at least partially through the first bore 19 and at least partially the second bore 21 to couple the axle clamp 10 to the landing gear fork 16.

A bushing 22 is positioned about the axle 12 and secured, such as threadedly coupled, to a first end 23 of the axle 12. A fastener 24 having a first flange 25 is threadedly coupled to the first end 23 of the axle 12, whereby at least a portion of the fastener 24 is inserted into the first end 23 to retain the landing gear fork 16 on the axle 12. A nut 26 is received, such as threadedly coupled, on the bushing 22, such that rotation of the nut 26 on the bushing 22 causes a preloading force on the wheel bearing 14. The axial preloading force urges the bearings (not shown) within the wheel bearing 14 to sit firmly against a raceway (not shown) embedded within the wheel hub 17. In this embodiment, the axle clamp 10 is capable of controlling the landing gear fork 16 such that its flexure does not contribute to the preloading of the wheel bearing 14 by retaining the landing gear fork 16 such that the landing gear fork 16 is unable to move along an axle axis 27 shown in FIGS. 1 and 2. In this way, the preloading force can be applied to the wheel bearing 14 independently of a variance or a tolerance in flexure of the landing gear fork 16 and the design of the landing gear fork 16 attached to it. More specifically, in this embodiment, the landing gear fork 16 is retained at the first leg 18 and the second leg 20 by the axle clamp 10. Because the axle clamp 10 retains the landing gear fork 16 from both inward and outward movement along the axle axis 27, the landing gear fork 16 is preloaded to a control width. Therefore, a tight control on preloading conditions can be achieved, which renders longer bearing life and improved bearing performance.

Figure 3:
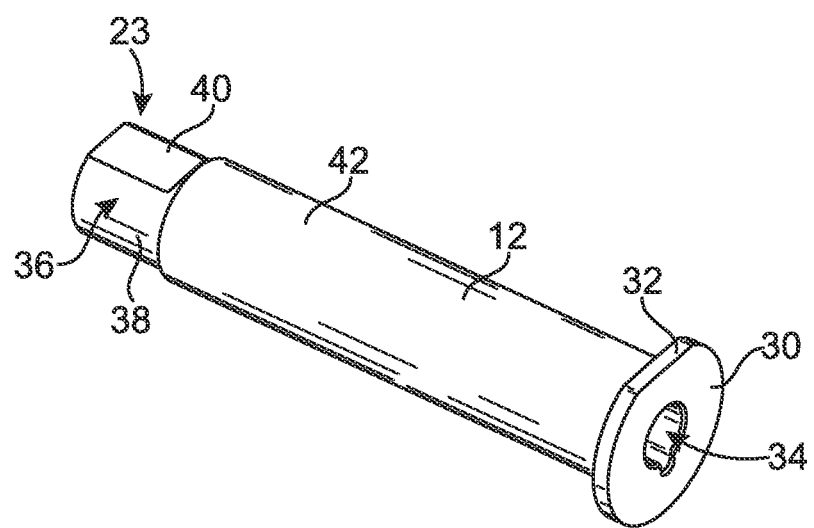
FIG. 3 is a perspective view of an axle suitable for use with the preloading axle clamp shown in FIG. 1.

Referring now to FIGS. 1 and 3, the axle 12 is shown having the first end 23 and a second end 28 opposite the first end 23. The second end 28 of the axle 12 includes a stationary flange 30 extending therefrom that is integrally formed with the axle 12. It is contemplated that the stationary flange 30 is adapted to retain various components of the axle clamp 10, the landing gear wheel bearing 14, and the landing gear fork 16 on the axle 12. As shown in FIG. 3, the stationary flange 30 is generally ringlike in shape with a straight edge 32 interrupting a portion of the ringlike geometry. Further, in one embodiment, the axle 12 is hollow to define a longitudinal bore 34 extending from the first end 23 to the second end 28. It is noted that other retaining mechanisms may be provided at the second end 28 of the axle 12, including mechanisms that may be movable or stationary, integrally or separately formed from the axle 12, and the like.

Still referring to FIGS. 1 and 3, in one embodiment the first end 23 of the axle 12 includes a broached portion 36 having a generally tubular body 38 and a flat face 40 disposed on at least a portion of the tubular body 38, such as on one side of the tubular body 38, to prevent or limit rotation of the bushing 22 about the axle 12. As shown in FIG. 3, the broached portion 36 may be slightly smaller than an axle body 42 extending from the broached portion 36 toward the second end 28, such that the broached portion 36 defines a cross-sectional diameter that is smaller than that of the axle body 42. It is contemplated that the axle body 42 is generally a smooth, tubular structure defining a portion of the longitudinal bore 34 extending therethrough. The broached portion 36 is shaped to receive the bushing 22 and permit sliding of the bushing 22 in a longitudinal direction L, as shown in FIG. 1, defined through the longitudinal bore 34. The broached portion 36 and the bushing 22 may include one or more features configured to prevent rotational movement of the bushing 22 about the tubular body 38. For example, the bushing 22 may include a surface that corresponds to the flat face 40 of the tubular body 42 to prevent rotation of the bushing 22 with respect to the tubular body 38. It is noted that other shapes may be used to define the broached portion 36, including ramps, edges, notches, and the like, which may provide for longitudinal motion and prohibit rotational motion of the bushing 22. Further, it is contemplated that the first end 23 of the axle 12 defines an inner threaded portion 44 along a portion of an inner surface defining the longitudinal bore 34, as shown in FIG. 2 for example. The inner threaded portion 44 is adapted to threadingly engage the fastener 24 (also referred to as a second screw), which includes a cooperating threaded portion.

Figure 4:
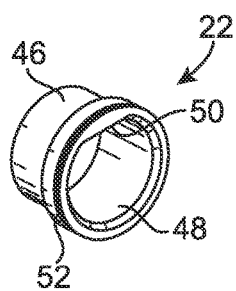
FIG. 4 is a perspective view of a bushing of the preloading axle clamp shown in FIG. 1.

Turning now to FIG. 4, the bushing 22 is shown having a generally cylindrical outer surface 46 and a broached inner surface 48 that corresponds in shape to the broached portion 36 of the axle 12. In particular, the broached inner surface 48 includes a flat wall 50 that is adapted to abut against and contact the flat face 40 of the axle 12 and slide along the flat face 40 of the axle 12 in operation. The interaction between the flat wall 50 and the flat face 40 prevents or limits rotational movement of the bushing 22 with respect to the axle 12. It is contemplated that any other geometry may be provided for the broached inner surface 48 that prevents or limits rotational movement but allows longitudinal sliding motion of the bushing 22. For example, the bushing 22 and/or the broached portion 36 of the axle 12 may be hexagonal-shaped, wedged, or have any suitable shape for controlling movement of the bushing 22 and/or for adaptation to other applications. Merely by way of example, such other configurations may include, without limitation, a telescoping stack of coaxial wedges, and wedges having sloped walls, such as a set of cones, prismatoids, or diagonal cupolas. Further, as shown FIGS. 2 and 4, the bushing 22 includes outer threads 52 that are adapted to threadingly engage the nut 26, which includes a cooperating threaded portion.

Figure 5:
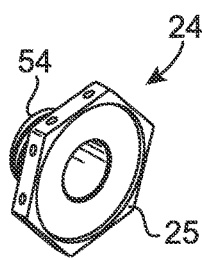
FIG. 5 is a perspective view of a fastener of the preloading axle clamp shown in FIG. 1.

Referring to FIG. 5, an exemplary fastener 24 is shown. The fastener 24 includes the first flange 25 that is generally hexagonal-shaped, although other shapes may be contemplated. A cylindrical, threaded post 54 extends from the first flange 25 and is configured to engage with corresponding threads at the first end 23 of the axle 12, such as the inner threaded portion 44 as shown in FIG. 2. It is contemplated that the fastener 24 provides a high stiffness constraint, such that when the nut 26 is tightened, the wheel bearing 14 is compressed. In one embodiment, the wheel bearing 14 is compressed into the wheel hub 17 to ensure positive contact with the embedded bearing race. Further, it is contemplated that both the fastener 24 having the first flange 25 and the stationary flange 30 operate as end supports on the axle 12 to constrain a supported vehicle, such as an aircraft, on the axle 12.

Figure 6:
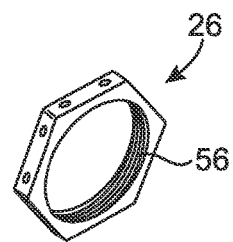
FIG. 6 is a perspective view of a nut of the preloading axle clamp shown in FIG. 1.

Turning now to FIG. 6, an exemplary nut 26 is shown. The nut 26 is generally hexagonal-shaped, which may provide gripping surfaces for rotating the nut 26 during operation. An inner surface of the nut 26 includes a helical thread 56 configured to threadedly engage cooperating threads formed on the bushing 22, such as the outer threads 52 of the bushing 22. It is contemplated that rotating the nut 26 along the outer threads 52 toward the first flange 25 generates a clamping force F1, as shown in FIG. 2, on the portion of the landing gear fork 16 that is received at the first end 23 of the axle 12. Referring further to FIG. 1, in one embodiment the axle 12 is positioned within the first bore 19 defined through the first leg 18 of the landing gear fork 16. The first flange 25 of the fastener 24 has a peripheral surface larger than a diameter of the first bore 19 such that at least a portion of the first flange 25 contacts a first side of the first leg 18 (and/or a fork bushing positioned within the first bore 19). Additionally, the bushing 22 and/or the nut 26 has a peripheral surface larger than the diameter of the first bore 19 such that the bushing 22 and/or the nut 26 contacts an opposite second side of the first leg 18 (and/or a fork bushing positioned within the first bore 19) to apply opposing compressive clamping forces on the first leg 18. In one embodiment, the nut 26 is rotatably disposed on the bushing 22, so that rotation of the nut 26 causes the bushing 22 to slide longitudinally along the first end 23 of the axle 12 to apply the preloading force F2, as shown in FIG. 2, on the wheel bearing 14 independently of a variance in flexure of the landing gear fork 16 or any suitable connecting fork. The fastener 24 is tightened against the first leg 18 to a first torque and the nut 26 is rotated toward the first leg 18 to increase the preloading force on the wheel bearing 14. That motion slidingly engages the bushing 22 on the axle 12 to move in an opposite direction, e.g., away from the first flange 25, to generate a compressive force F3, as shown in FIG. 2, on the wheel bearing 14.

Figure 7:
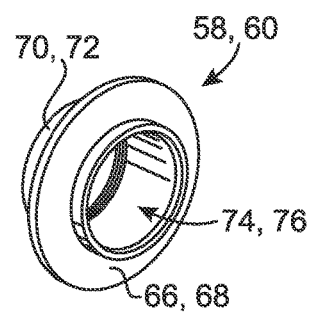
FIG. 7 is a perspective view of a spacer bushing of the preloading axle clamp shown in FIG. 1.

In reference to FIG. 7, a perspective view of an exemplary spacer bushing 58, 60 is shown. It is contemplated that the axle clamp 10 includes a pair of spacer bushings, such as a first spacer bushing 58 and a second spacer bushing 60 disposed on the axle 12, as shown in FIGS. 1 and 2. In one embodiment, the first and second spacer bushings 58, 60 abut a first side 62 and a second side 64 of the wheel bearing 14, respectively, to transfer the preloading force to the wheel bearing 14. In particular, the first spacer bushing 58 abuts a portion of the bushing 22 in order to receive and transfer the preloading force from the bushing 22 to the wheel bearing 14. The second spacer bushing 60 is adjacent the second leg 20 of the landing gear fork 16 or the retainer, such as a fork bushing, at the second end 28 of the axle 12. In the present embodiment, as shown in FIG. 7, the first spacer bushing 58 includes a first spacer flange 66. The first spacer flange 66 is disposed on a generally tubular-shaped first spacer body 70, having a first axial opening 74 adapted to receive the axle 12 therethrough. Similarly, the second spacer bushing 60 includes a second spacer flange 68. The second spacer flange 68 is disposed on a generally tubular-shaped second spacer body 72, having a second axial opening 76 adapted to receive the axle 12 therethrough.

Figure 8:
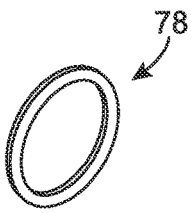
FIG. 8 is a perspective view of an axle adapter of the preloading axle clamp shown in FIG. 1.

Turning to FIG. 8, a perspective view of an exemplary axle adapter 78 is shown. In one embodiment, the axle adapter 78 is generally a ringlike structure that is adapted to be placed on the bushing 22 between the nut 26 and the landing gear fork 16, as shown in FIG. 2. In some embodiments, as provided in FIG. 2, the axle adapter 78 abuts the nut 26 and a fork bushing 80, which is in further contact with the landing gear fork 16. In a particular embodiment, the fork bushing 80 assists in securing the landing gear fork 16 to the bushing 22. The axle adapter 78 is configured to receive a clamping force from the nut 26 and transfer the clamping force toward the landing gear fork 16 and/or the fork bushing 80. The clamping force may be counteracted by an opposing force generated by the stiffness of the fastener 24 and, more particularly, the first flange 25 of the fastener 24.

Referring back to FIG. 2, the axle clamp 10 deployed on the axle 12 generates the preloading force F2 on the wheel bearing 14. In one embodiment, the nut 26 is rotated on the bushing 22 in a direction that causes the bushing 22 to slide along the longitudinal axle axis 27 in a direction toward the wheel bearing 14. The bushing 22 pushes against the first spacer bushing 58 and slides the first spacer bushing 58 toward the wheel bearing 14 to push on the wheel bearing 14. The sliding motion is permitted by an axial gap 82 defined, in part, by a step 84 where the broached portion 36 joins the tubular body 38 of the axle 12. Further, the step 84 prevents over-sliding of the axle clamp 10, which may cause too much preloading force to be applied to the wheel bearing 14. It is contemplated that the size of the axial gap 82 can be modified for different applications. For instance, the first spacer body 70 of the first spacer bushing 58 may have a shorter length or a longer length along the longitudinal axle axis 27 to limit the axial gap 82 and, therefore, the axial distance traveled for the bushing 22 during the preloading process.

Figure 9:
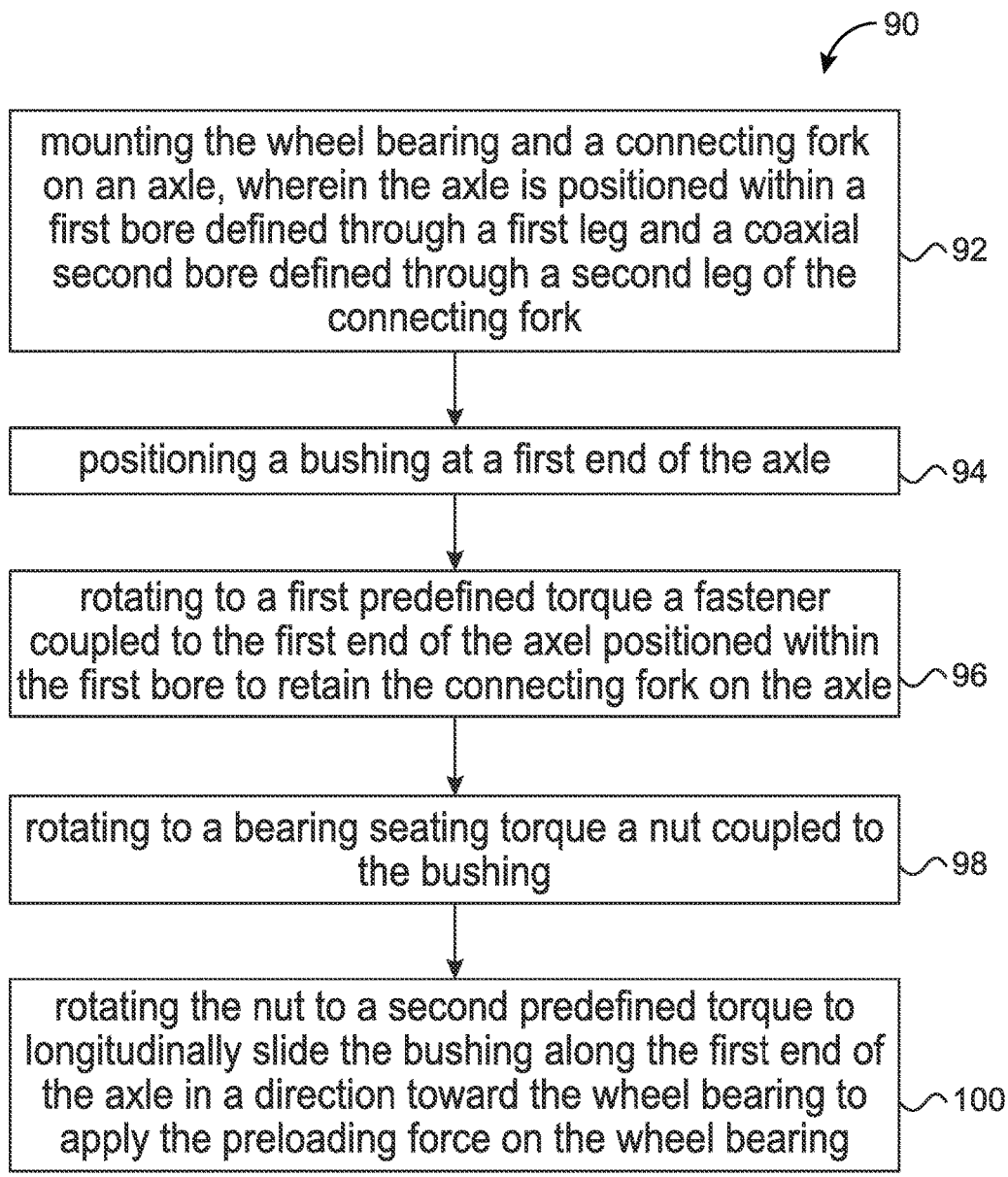
FIG. 9 illustrates an exemplary method of controlling a preloading force on a wheel bearing.

Turning now to FIG. 9, steps of an exemplary method 90 of controlling a preloading force on a wheel bearing is shown. The wheel bearing 14 and the landing gear fork 16 are mounted 92 on the axle 12. In the exemplary embodiment, the axle 12 is positioned within a first bore 19 defined through a first leg 18 and a coaxial second bore 21 defined through a second leg 20 of the landing gear fork 16. The bushing 22 is positioned 94 at the first end 23 of the axle 12. The fastener 24 coupled to the first end of the axle 12 positioned within the first bore 19 is rotated 96 to a first predefined torque to retain the landing gear fork 16 on the axle 12. The nut 26 coupled to the bushing 22 is rotated 98 to a bearing seating torque. The nut 26 is then rotated 100 to a second predefined torque to longitudinally slide the bushing along the first end 23 of the axle in a direction toward the first spacer bushing 58 to apply the preloading force F2 on the wheel bearing 14.

In some embodiments, the method further includes rotating the nut 26 toward the fastener 24 to generate a clamping force F1 on the first leg 18 of the landing gear fork 16. Securing the nut 26 includes seating the wheel bearing 14, backing off, and tightening the nut 26 again to a final torque. The axle adapter 78 is provided on the axle 12 between the nut 26 and the landing gear fork 16. A safety wire (not shown), such as a steel wire, may further be coupled to the fastener 24 and/or the nut 26 by twisting the safety wire therebetween to prevent loosening of the fastener 22 and/or the nut 26.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments. The word "exemplary" is used herein to mean serving as an example, instance, or illustration. Any aspect or embodiment described herein as "exemplary" is not necessarily to be construed as preferred or advantageous over other aspects or embodiments.

What is claimed is:

1. A preloading axle clamp for a wheel bearing, the preloading axle clamp comprising:
    an axle adapted to receive the wheel bearing and a connecting fork, wherein the first end of the axle is positioned within a bore defined through a leg of the connecting fork;
    a bushing positioned about a first end of the axle;
    a fastener having a first flange and coupled to the first end of the axle, wherein a portion of the fastener is inserted into the first end to retain the connecting fork on the axle; and
    a nut threadedly coupled to the bushing, wherein rotation of the nut on the bushing causes a preloading force on the wheel bearing, and
    wherein the fastener contacts a first side of the leg of the connecting fork and the nut contacts an opposite second side of the leg of the connecting fork to apply opposing compressive clamping forces on the leg.

2. The preloading axle clamp of claim 1, wherein the first end of the axle is threaded and a portion of the fastener is correspondingly threaded for rotatably engaging the fastener to the first end of the axle.

3. The preloading axle clamp of claim 1, wherein a second end of the axle provides an opposing second flange adapted to retain the connecting fork on the axle.

4. The preloading axle clamp of claim 1, further comprising a first spacer bushing and a second spacer bushing disposed on the axle, wherein the first spacer bushing abuts a first side of the wheel bearing and the second spacer bushing abuts an opposite second side of the wheel bearing.

5. The preloading axle clamp of claim 4, wherein the first spacer bushing abuts a portion of the bushing to receive the preloading force from the bushing to the wheel bearing.

6. The preloading axle clamp of claim 1, wherein the first end of the axle is shaped to prevent rotational movement of the bushing with respect to the axle.

7. The preloading axle clamp of claim 1, wherein the first end of the axle comprises a flat surface.

8. The preloading axle clamp of claim 7, wherein the bushing is adapted to slide longitudinally along the first end of the axle.

9. The preloading axle clamp of claim 1, wherein the nut is rotatably disposed on the bushing, so that rotation of the nut causes the bushing to slide longitudinally along the first end of the axle to apply the preloading force on the wheel bearing independently of a variance in a connecting fork flexure.

10. The preloading axle clamp of claim 9, wherein the fastener is tightened against the leg to a first torque and the nut is rotated toward the leg to increase the preloading force on the wheel bearing.

11. The preloading axle clamp of claim 9, further comprising an axle adapter disposed on the bushing between the first flange of the fastener and the nut.

12. A method of controlling a preloading force on a wheel bearing, the method comprising:
mounting the wheel bearing and a connecting fork on an axle, wherein the axle is positioned within a first bore defined through a first leg and a coaxial second bore defined through a second leg of the connecting fork;
positioning a bushing at a first end of the axle;
rotating to a first predefined torque a fastener coupled to the first end of the axle positioned within the first bore to retain the connecting fork on the axle;
rotating to a bearing seating torque a nut coupled to the bushing; and
rotating the nut to a second predefined torque to longitudinally slide the bushing along the first end of the axle in a direction toward the wheel bearing to apply the preloading force on the wheel bearing.

13. The method of claim 12, further comprising rotating the nut toward the fastener to generate a clamping force on the first leg of the connecting fork.

14. The method of claim 12, wherein rotating a nut includes seating the bearing assembly, backing off, and tightening the nut to a final torque.

15. The method of claim 12, further comprising positioning an axle adapter between the nut and the connecting fork.

16. A preloading axle clamp for a wheel bearing, the preloading axle clamp comprising:
an axle adapted to receive a wheel bearing and a connecting fork, a first end of the axle having a broached surface;
a bushing positioned about the axle and slidingly engaging the broached surface;
a retainer provided on a second end of the axle, wherein the retainer is stationary and fixed to the second end of the axle; and
a nut rotatably coupled to the bushing, wherein rotation of the nut slides the bushing toward the wheel bearing to apply a preloading force on the wheel bearing, and further rotation of the nut applies a clamping force on a first leg of the connecting fork.

17. The preloading axle clamp of claim 16, further comprising a fastener threadedly coupled to an inner surface of the first end of the axle, wherein the fastener provides a stiffness to generate a counteracting force component on the first leg of the connecting fork when the clamping force is applied.

18. The preloading axle clamp of claim 16, further comprising an axle adapter disposed on the bushing, wherein the axle adapter abuts the nut and transfers a clamping force from the nut to the first leg of the connecting fork.

19. The preloading axle clamp of claim 16, further comprising a first spacer bushing contacting a first side of the wheel bearing and a second spacer bushing contacting a second side of the wheel bearing, wherein the first spacer bushing abuts the bushing and the second spacer bushing is adjacent a fork bushing positioned within a bore defined by a second leg of the connecting fork.

* * * * *